US007751841B2

United States Patent
Sung et al.

(10) Patent No.: US 7,751,841 B2
(45) Date of Patent: Jul. 6, 2010

(54) METHOD AND SYSTEM FOR PROCESSING POC CALL BASED ON ANSWER MODE OF PUSH TO TALK OVER CELLULAR SYSTEM CLIENT

(75) Inventors: Sang-Kyung Sung, Seoul (KR);
Joon-Goo Park, Yongin-si (KR);
Kyung-Tak Lee, Yongin-si (KR);
Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1044 days.

(21) Appl. No.: 11/280,843

(22) Filed: Nov. 16, 2005

(65) Prior Publication Data

US 2006/0142037 A1 Jun. 29, 2006

(30) Foreign Application Priority Data

Nov. 17, 2004 (KR) ...................... 10-2004-0094373

(51) Int. Cl.
*H04Q 7/20* (2006.01)
(52) U.S. Cl. ........................ 455/518; 455/519; 455/517; 455/500; 455/445; 455/466; 370/328; 370/329; 370/310
(58) Field of Classification Search ................. 455/518, 455/519, 517, 500, 466, 412.1, 412.2, 422.1, 455/403, 414.1, 414.2, 414.3, 550.1, 567, 455/445; 370/328, 329, 310
See application file for complete search history.

(56) References Cited

U.S. PATENT DOCUMENTS 7,415,284 B2 * 8/2008 Hoover et al. ............... 455/518
2005/0124367 A1 6/2005 Hassan et al.
2005/0192039 A1 * 9/2005 Xue et al. .................... 455/517
2006/0046758 A1 * 3/2006 Emami-Nouri et al. ...... 455/518
2006/0053225 A1 * 3/2006 Poikselka et al. ........... 709/227

FOREIGN PATENT DOCUMENTS

| JP | 2004-147127 | 5/2004 |
|---|---|---|
| RU | 2001124419 | 7/2003 |
| WO | WO 00/47005 | 8/2000 |
| WO | WO 01/67787 | 9/2001 |
| WO | WO 02/085051 | 10/2002 |
| WO | WO 2004/086791 | 10/2004 |
| WO | WO 2005/101697 | 10/2005 |

OTHER PUBLICATIONS

Akshai Parthasarathy, "Push to Talk over Cellular (PoC) Server", Dec. 10, 2004.

* cited by examiner

*Primary Examiner*—Keith T Ferguson
(74) *Attorney, Agent, or Firm*—The Farrell Law Firm, LLP

(57) ABSTRACT

Disclosed is a method and system for establishing a session for a Push to Talk (PTT) over Cellular call (PoC). In the method, when an answer (response) mode of a PoC server and a PoC client are not in accordance with each other, an error message is transmitted to the receiving PoC server Moreover, call processing for a PoC call is improved by inserting a new data field indicating an automatic answer of a server into a payload of a Real-time Transport Protocol (RTCP) message, and a function of the terminal is extended using an added data field when the answer modes of the corresponding PoC server and PoC client are not in accordance with each other.

28 Claims, 7 Drawing Sheets

| | |
|---|---|
| 1 | PoC ADDRESS OF INVITED PoC USER |
| 2 | MEDIA PARAMETERS GIVEN BY PoC CLIENT/SERVER |
| 3 | PoC SERVICE INDICATION |
| 4 | PoC ADDRESS OF THE INVITING PoC USER AT PoC CLIENT |
| 5 | CONTROLLING PoC FUNCTION ASSIGNED INDICATION |
| 6 | TALK BURST CONTROL PROTOCOL PROPOSAL |

FIG. 4
(PRIOR ART)

| VERSION | P | SUBTYPE | PACKET TYPE | LENGTH |
|---|---|---|---|---|
| SSRC / CSRC ||||| 
| NAME (ASCII) ||||| 
| PoC ADDRESS OF SENDING PoC USER || | DISPLAY NAME OF SENDING PoC USER ||
| MANUAL ANSWER OVERRIDE INDICATION || | AUTO-ANSWER INDICATION | OTHER APPLICATION DEPENDENT DATA 1 |
| OTHER APPLICATION DEPENDENT DATA 2 |||||

FIG. 7

| VERSION | P | SUBTYPE | PACKET TYPE | LENGTH |
|---|---|---|---|---|
| SSRC / CSRC |||||
| NAME (ASCII) |||||
| SDES ITEM || | APPLICATION DEPENDENT DATA ||
| SDES ITEM || | SESSION BYE REQUEST | ERROR CODE |
| APPLICATION DEPENDENT DATA 2 |||||

FIG. 8

METHOD AND SYSTEM FOR PROCESSING POC CALL BASED ON ANSWER MODE OF PUSH TO TALK OVER CELLULAR SYSTEM CLIENT

PRIORITY

This application claims priority under 35 U.S.C. §119 to an application entitled "Method And System For Processing PoC Call Based On Answer Mode Of Push To Talk Over Cellular System Client" filed in the Korean Intellectual Property Office on Nov. 17, 2004 and assigned Serial No. 10-2004-0094373, the contents of which are incorporated herein by reference.

BACKGROUND OF THE INVENTION

1. Field of the Invention

The present invention relates to a method of establishing a session for a Push-to-Talk (PTT) over Cellular (PoC) call. More particularly, the present invention relates to a method and system for processing a PoC call based on an answer mode of push to talk over cellular system client, that is capable of processing a call in consideration of an answer mode mismatch between a PoC server and a PoC terminal when a receiving PoC user established home PoC server and a pre-established session in the PoC terminal and an AUTO-ANSWER mode in the PoC server.

2. Description of the Related Art

Due to significant development of mobile communications technologies and the expansion of mobile communications networks, various services and applications which use cellular phones are being provided. At the same time, demand among cellular phone users for various extra services such as location services, a multimedia services, and a PTT services is increasing. Among these extra services, the PTT service supports various supplementary functions such as an instant messenger function and a status display function, as well as a group call and a voice call which are also provided by an existing radio or a trunked radio system (TRS).

Standardization of PoC services which employ the PTT function in a mobile communication network is actively proceeding. One unique feature of the PoC service is that a user can participate in a plurality of PoC sessions and so can move among the PoC sessions to use a call service. A requirement that a user can move among a plurality of PoC sessions to use a call service is specified in the Open Mobile Alliance (OMA) which is a forum for specifying mobile communications services.

FIG. 1 is a block diagram illustrating a conventional PoC service system. Referring to FIG. 1, a PoC client 10, which is a service requester installed in a mobile station, (not shown) (i.e., a PoC terminal), is connected to a SIP/IP core network 30 which supports Session Initiation Protocol (SIP) and Internet Protocol (IP) multimedia functions via an access network 20.

The PoC client 10 resides in the PoC terminal and provides access to the PoC service. The PoC client 10 initiates a PoC session, participates in a PoC session that is currently proceeding, and terminates a PoC session as its main function. The PoC client 10 creates and transfers a talk burst, supports an instant personal alert, and performs authentication when accessing the PoC service. Hereinafter, unless otherwise stated, the PoC client 10 is assumed to be the same as a PTT service subscriber.

The SIP/IP core network 30 is connected to a PoC server 60, a group list management system (GLMS) 50, and a presence server 70 in order to support the PoC service.

The PoC server 60 has a controlling PoC function for maintaining a PoC session, or a participating PoC function for participating in a PoC session for a one-to-one PoC call or a one-to-many PoC call (or group PoC call). The remote PoC network 80 includes the PoC client 10, access network 20, SIP/IP core 30, GLMS manager 40, GLMS 50, PoC server 60, presence server 70 from the PoC client 10 to the presence server 70 as described above.

A function of the PoC server is classified into a controlling PoC function (CF) for maintaining a PoC session in general and a participating PoC function (PF) for maintaining each PoC session. The functions of the CF and the PF will be explained below with reference to Tables 1 and 2, respectively.

TABLE 1

| Controlling PoC Function (CF) |
|---|
| Provides centralized PoC session handling |
| Provides the centralized Media distribution |
| Provides the centralized Talk Burst Arbitration functionality including talker identification |
| Provides SIP session handling, such as SIP session origination, termination, etc. |
| Provides policy enforcement for participation in group sessions |
| Provides participant information |
| Collects and provides centralized media quality information |
| Provides centralized charging reports |
| May provide transcoding between different codecs |
| Supports Talk Burst Control Protocol Negotiation |

As shown in Table 1, the CF maintains a PoC session in general. The PoC server receives requests for the floor from PoC clients, arranges an order in which to give the clients the floor, and gives the clients the floor in that order. The PoC server also distributes a talk burst from a specific PoC client to all PoC clients participating in a group PoC call, and provides information of the PoC clients participating in the group PoC call.

As shown in Table 2, the PF manages a PoC session between the CF and each PoC client. The PF relays the floor to the PoC client from the CF. The PF relays media between the CF and the PoC client, provides transcoding between different codecs, and provides a filtering function for filtering one of two PoC sessions chosen by a user when there is simultaneous voice communication in two simultaneous PoC sessions.

TABLE 2

| Participating PoC Function (PF) |
|---|
| Provides PoC session handling |
| May provide the Media relay function between PoC Client and Controlling PoC server |
| May provide user media adaptation procedures |
| May provide the Talk Burst control message relay function between PoC Client and Controlling PoC server |
| Provides SIP session handling, such as SIP session origination, termination, etc, on behalf of the represented PoC Client. |
| Provides policy enforcement for incoming PoC session (e.g., access control, incoming PoC session barring, availability status, etc.) |
| May collect and provide media quality information |
| Provides the participant charging reports |
| May provide filtering of the media streams in the case of simultaneous sessions |
| May provide transcoding between different codecs |

TABLE 2-continued

Participating PoC Function (PF)

May support Talk Burst Control Protocol Negotiation
Stores the current Answer Mode and Incoming PoC Session Barring preferences of the PoC Client In the PoC system configured as described above, a PoC user can input information on a group and information on a group member in a GLMS manager 40 through the user's terminal, or identify information on the PoC users whom the user can call through an individual or a group list transmitted from the GLMS manager 40. Another method where the group and group member can be generated, corrected, and managed in the GLMS manager 40 is to input them through a communication network considered to be reliable by the PoC service provider, such as Internet or an Intranet.

In order to use a PoC call service, the PoC user registers the user's PoC address in the SIP/IP core 30. At this time, the SIP/IP core 30 stores information on the PoC user based on the PoC user's request. Accordingly, when other PoC users wish to make a PoC group call, the user registers the user's information in the SIP/IP core 30 network first, and makes a call request to the user's SIP/IP core network using group identification information transmitted from the GLMS 50. At this time, the SIP/IP core 30 determines an address and a domain location using information on requesting PoC user information, and then transmits a PoC call request to a home PoC server 60 in which the requesting PoC user is registered. The PoC server 60 prepares PoC session establishment for such a PoC call request, obtains each user's information from the GLMS 50, and transfers a call request signal to the corresponding SIP/IP core network. At this time, in the case of a call request for users in an intradomain, the PoC server 60 performs both of PF and CF functions. The PoC server 60 managing a PoC user to whom a call request is made uses PoC user information transferred thereto, determines the location of the SIP/IP core network, and then makes a call request to the PoC user.

The present invention relates to call processing technology for setting up a call of a PoC system which enables an immediate call according to the call request using an IP Multimedia CN Subsystem (IMS) network which is currently being standardized, using a call in the form of a half duplex communication, and using group and presence information of the user. Specially, in the call processing to set up such a PoC call, various procedures can be performed according to request and situation of sender and receiver. Features of the PoC system requested in the OMA according to the setup of the sender and receiver are as follows.

First, the receiver can set up its own response mode according to the request of the PoC user and generally divide the response mode into an automatic response mode and a manual mode.

The automatic response mode means that when included in the PoC user list assigned in the receiver, a corresponding network immediately sends the response to the sender, instead of a manual response of the receiver. Because the PoC server has a function to store the response mode and the corresponding user list according to the response mode setup request of the terminal, the network automatically sends the response instead of operation of the terminal. Meanwhile, the manual response mode that corresponds to a case that the receiver is not included in the automatic response user list, a case that it is not clear that the receiver is included in the automatic response user list, or a case that the receiver is set up to manually respond to all users, means that the PoC call request is transmitted to the user's terminal through the receiving network and the call is connected under permission of the PoC user.

Second, the PoC system is divided into an on-demand session mode and a pre-established session mode according to whether the system is connected and set up to the PoC server in the user home network.

The pre-established session mode means that the PoC user sets up a specific session in advance between the PoC client and the PoC server belonging to the user's home network according to the user's request. Such a pre-established session is a function that the PoC user negotiates media parameters with the PoC server in advance so that a rapid call setup is embodied without renegotiation of the media parameter between the server and the client to be used in the future. The pre-established session is embodied when the PoC client provides the media parameters that are supported to a Session Description Protocol (SDP) body through an SIP INVITE method and responds to the media parameters provided by the server. In order to make the pre-established session, the PoC client sends identification information of the pre-established session newly set up in the response message from the server including a conference Uniform Resource Identifier (URI) to the PoC user. In the case of using such a pre-established session, it is possible to pre-establish an IP address, a port number, a codec to be used, and a talk burst control protocol.

The on-demand session mode means the state that the PoC user did not make the pre-established session and performs a PoC call connection procedure after receiving an invitation message of another PoC user.

Meanwhile, the PoC specification that is under the standardization in the OMA has following features rather than the basic functions of the communication system described above.

First, the PoC system supports a manual answer override (MAO) mode in which the receiver automatically sends a response to the PoC user who is pre-established and granted regardless of the response mode of the PoC receiver and connects a call in the receiving terminal. A request of the MAO is supported only to granted call requesters and a PoC call request message (INVITE) including the MAO indicator is transferred. Such an MAO request is a PoC function suitable for responding to emergencies and public services such as, emergency response communications, disaster relief communications, rescue and response communications, etc. However, such an MAO is a function that can be optionally embodied in a standard document (e.g., an Open Mobile Alliance (OMA) standard document) depending on an operator. Moreover, the MAO function cannot operate unless the opposite network supports this function even though the PoC client supports the MAO in its own home network.

Next, a setup of the response mode for the call request in the PoC system can be stored in both the PoC server which is an element on the network and the PoC client which is a terminal of the user side. Specially, when establishing a response mode in the home network managing the PoC client, the response mode is embodied in the PoC server which performs a session participating PoC function (PF) in the home network including the PoC client. As such, in the case of establishing the response mode of the network side, when the PoC call is requested from another PoC server, the PF automatically transfers a session progress message to the call request network in response to the request, so that the call request procedure is simplified when compared to the procedure wherein the session setup message is transferred to the PoC client and thereafter responded to.

However, in the case that the response is automatically performed in the network, since a result other than a user's response will can occur, the PoC user can set up the response mode even in the user's client, and at this time, it is characterized in that the response mode of the user's client is established to the response mode setup on the network. It is for solving a privacy problem occurring when a response mode is not reflected in real time due to a signal delay or an error in a radio access network or EP core network, when the PoC user changes the user's response mode through the terminal and requires the PoC server to update the response mode. To sum up, while the PoC service can set up the user's response mode in both the PoC server and PoC client, the media (actual user's voice) stream is transferred on the basis of the PoC session connection through behavior determined by a user's will.

Considering various functions and characteristics of the PoC system, various PoC call processing procedures can be generated. The present invention relates to a method for providing message information to display an automatic response for a general PoC call request of the sender (in the case that an optional MAO is not requested) and performing call processing for the PoC call request in interworking with the respond mode setup of an end PoC terminal, when a session is pre-established between the PoC server of the PoC call receiver and the client and an automatic response mode is set up in the PoC server.

Hereinafter, a conventional PoC session connection procedure in a PoC system having characteristics described above will be explained with reference to FIGS. 2 and 3. FIGS. 2 and 3 are flow diagrams illustrating respective call processing procedures of a call sender and a call receiver, when a general PoC call requester requests the call processing by sending the request message using the SIP protocol, and the automatic response mode is set up and a pre-established session exists in the receiver.

First, referring to FIG. 2, in Step 1 a PoC Client A sends an INVITE request including SIP address information of a receiver whom the Client A wishes to talk to an SIP/IP Core A. At this time, the INVITE request includes elements such as PoC address information of a call request client, a required media parameter, and characteristic information indicating the PoC service, and is transferred (in step 2) to a participating PoC server by way of corresponding servers (e.g., proxy-call server control function (P-CSCF)) and a serving-call server control function (S-CSCF, not shown)) in the IMS network through a path query in a dynamic host configuration protocol (DHCP) server or a domain name server (DNS) server (not shown). Since the participating PoC server connected to the PoC user when requesting a general call can be embodied in separation with the controlling PoC server managing a talk burst of the opened session, the INVITE request sent at steps 1 and 2 is transferred to the controlling PoC server X by way of an SIP/IP Core network of each network (in steps 3-5).

A controlling network including a CF transfers the call request message transferred in 5 to the corresponding SIP/IP Core network and then receives a response message. While the SIP message responding in the receiving network may be a provisional response message (i.e., a 1XX-type message), a successful response message (i.e., a 2XX-type message), or error response messages (i.e., a 4XX-6XX-type message), the present invention primarily describes a normal call processing procedure. The 1XX-6XX-type messages are known in the art and are not described further herein for the sake of clarity. After step 5 is performed, the CF can receive an AUTO-ANSWER response or an OK response. In the case of the AUTO-ANSWER response in FIG. 2, the CF can receive an SIP 183 "Session Progress" signal, and progress connection between the PoC server and the client in an IMS network of the requester. A call permission signal of the receiver is sent as an SIP 183 Session Progress or an SIP 200 "OK" response, and transferred to the PoC client A by way of the PoC servers of the CF and PF (steps 6-10). Meanwhile, after the CF receives the 200 OK response or the 183 Session Progress signal from the receiving PoC server, it determines that the PoC call is connected and sends a floor granted signal with which a talk burst floor is granted for the client A (steps 11-12). After the PoC client A receives confirmation response signals in steps 6-10 corresponding to the INVITE request, it receives the floor granted signal using a real time control protocol (RTCP) message to transfer a talk burst transmission permission signal (call connection sound) (in steps 11-12). At this time, the floor granted signal is generated in the CF having a talk burst negotiation right and transferred to the PoC client through the PF managing the corresponding PoC client, and may be transferred without passing through the SIP/EP Core network by using a path of a bearer rather than the SIP protocol. Finally, the PoC user who confirmed such a call connection sound transfers the media (voice, representatively) stream using a real time protocol (RTP).

FIG. 3 is a flow diagram illustrating a conventional procedure in the receiver when a session between the server and the client in the receiver was pre-established corresponding to call procedures in the sender. (At this time, it is assumed that media feature values between the PoC server establishing a pre-established session and the PoC client are used as they are without changing when a new session is requested).

An INVITE request call request message received from the sending network is transferred to the PoC server included in the home network of the receiving PoC client according to a call processing procedure of the IMS network (in steps 1-3). At this time, since the PF B (PoC server B)set up its response mode setup value as an automatic response mode, the PF B sends the SIP 200 "OK" message to the sending network corresponding to the call request message (in steps 4-6). Further, since the pre-established session need not be changed, the PF B does not send the call request message to the PoC client connected to the PF B.

Meanwhile, the PoC server of the controlling network that has received an OK response acknowledged through an IMS path completes the PoC call processing procedure by sending an OK response to the sending PoC client (step 7), and sends the floor granted signal with which a talk burst floor is granted to the sending PoC client (step 8). Meanwhile, the CF sends the PoC address of the PoC user having the floor or a sending Talk Burst signal including a display name to the receiving PoC user while sending the RTCP message which grants the floor (steps 9-10), so that the receiving PoC client can receive sender information of a media stream to be transferred in advance. Talk Burst signal uses the bearer path (as in FIG. 2) as opposed to the SLP protocol, and therefore can be transferred without passing through the SIP/IP Core network. Meanwhile, the media (voice) stream sent from the sender is transferred to the client B using the RTP protocol through the path of the media bearer, thereby starting a call.

FIG. 4 is a table illustrating information elements included in the INVITE request requested by the sender corresponding to step 1 of FIG. 3. The call request message includes PoC addresses of the PoC call requester and receiver, media parameter information given by in the client or server, an indicator indicating a PoC call, an indicator set up in the PoC server, a talk burst control protocol to negotiate between sending and receiving networks, etc.

When the PoC server managing the pre-established session set ups an automatic response mode for the PoC client in which the pre-established session exists, the PF directly acknowledges the OK response without sending the AUTO-ANSWER in the call request processing procedure of the conventional art.

The OK response in the receiving PoC server is sent to the sending network so that the sending PoC client receives the talk burst permission signal together with the OK response signal and transfers an actual media stream. Further, since the CF which is a PoC server has received the 200 OK signal, it directly transfers the transferred media stream to the receiving network without buffering it. Further, since the PoC server of the receiving network does not accompany a separate SIP signal for the transferred media stream, it directly transfers the media stream to the receiving PoC client using the RTP.

As such, when following the session procedure and media transfer procedure in which the pre-established session and automatic response mode are set up, if a response mode of the receiving PoC client is not automatically set up (that is, when other race conditions occur in the response mode set up between the server and the terminal due to a temporary response mode change), the receiving PoC client cannot obtain information to process a transferred media stream, which is an undesirable consequence. In the above example, the "race condition" indicates that the state the mode of the PoC server is different from that of the PoC client by time delay, etc. For example, a PoC client request to change the PoC server's mode from an "Auto-answer mode" to a "Manual-answer mode". In this case, the time delay (e.g., from the time the PoC client requests to the time the PoC server changes its mode reflecting the PoC client's request) can be called a "race condition".

SUMMARY OF THE INVENTION

It is, therefore, an objective of the present invention to provide a method and system for processing a call based on an answer mode of a Push-to-Talk (PTT) over Cellular (PoC) system client in which when an automatic response mode is set up in a pre-established session and a response mode change of a receiving PoC client is not reflected, response mode information is transferred to the PoC client in order to process a transferred media stream in a receiving terminal so that the call processing is performed to immediately cope with the changed response mode of the PoC client.

According to an aspect of the present invention, there is provided a call processing method in a PoC network in which a session is established in advance between a receiving PoC client and a receiving PoC server, and an automatic response mode is established in the receiving PoC server, the method including receiving, at the receiving PoC server, a call request message transmitted from a sending PoC server; sending, at the receiving PoC server, a response signal for the call request message; and receiving information to notify that a media stream will be transmitted to the receiving PoC client.

According to another aspect of the present invention, there is provided a call processing system in a PoC network in which a session is established in advance between a receiving PoC client and a receiving PoC server, and an automatic response mode is established in the receiving PoC server, the system including a receiving PoC server for receiving a call request message transmitted from a sending PoC server, and sending a response message for the call request message; and a receiving PoC client for receiving information to notify that a media stream will be received from the receiving PoC server.

In a receiving PoC system in which a receiving PoC client and a receiving PoC server operate in an automatic response mode and a session is pre-established, provided is a process of transferring, at a PF, information including additional data to the receiving PoC client when a call connection request message is received from a sending PoC server. Accordingly, the receiving PoC client notifies that the media stream will be immediately received even in the automatic response mode.

BRIEF DESCRIPTION OF THE DRAWINGS

The above and other objects, features and advantages of the present invention will become more apparent from the following detailed description when taken in conjunction with the accompanying drawings in which:

FIG. 4 is a table illustrating information elements included in an INVITE request transmitted by a sender for a PoC call request;

FIG. 7 is a view showing an real time control protocol (RTCP) message payload format including an automatic answer indication; and FIG. 8 is a view showing an RTCP payload format transmitted from a receiving client when rejecting an automatic answer mode.

DETAILED DESCRIPTION OF THE PREFERRED EMBODIMENTS

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided to convey the scope of the invention to those skilled in the art.

Figure 5:
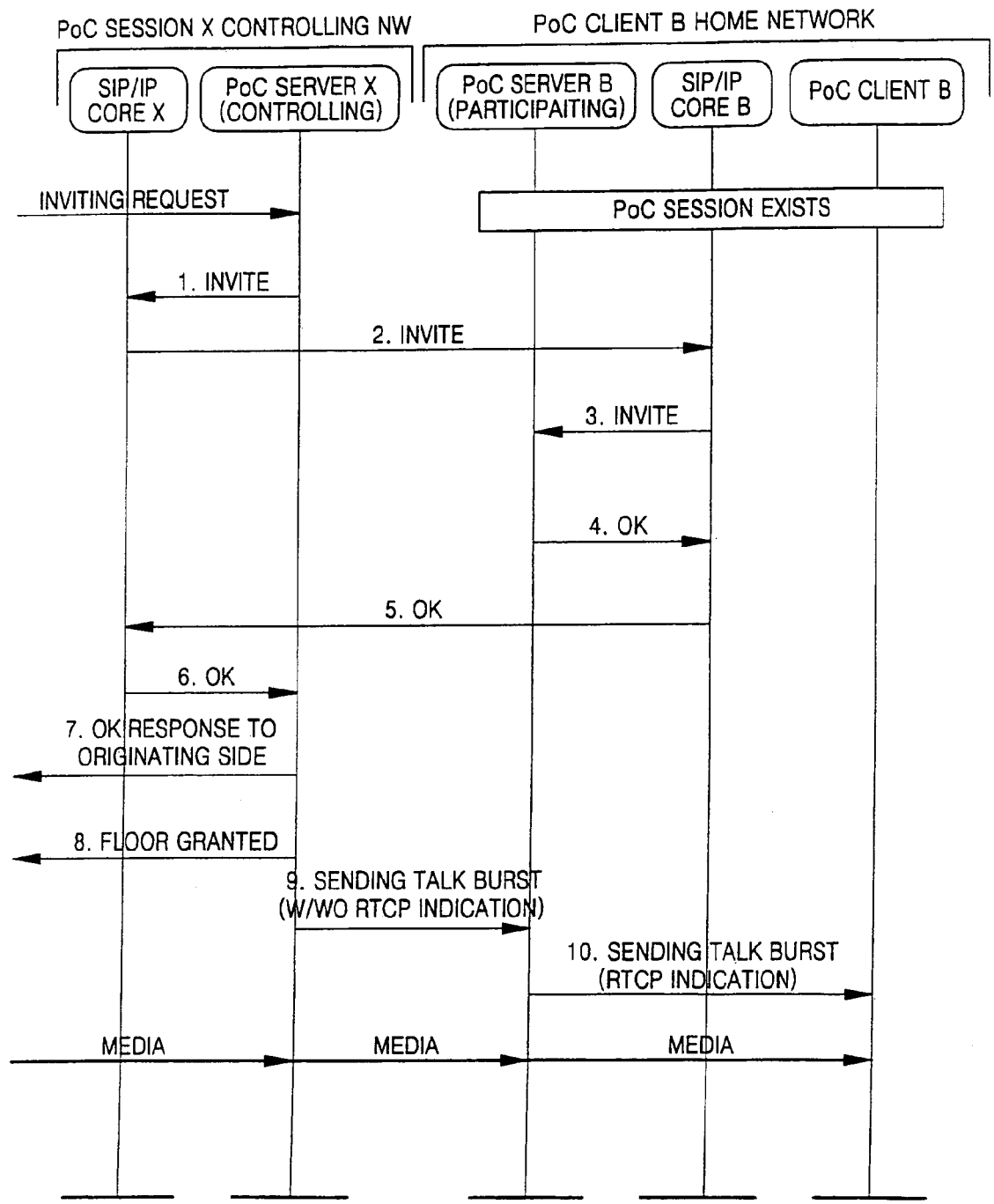
FIG. 5 is a flow diagram illustrating a PoC call connection processing procedure including an RTCP message in accordance with a first embodiment of the present invention.

A call connection procedure suggested according to the present invention will now be described with reference to FIG. 5. FIG. 5 is a flow diagram illustrating a PoC call connection processing procedure including an RTCP message when a receiving PF is set in an automatic response mode for a client having a pre-established session. First, a controlling PoC server receives a call request message including PoC call information from a network of a PoC call requester and then transfers the call request message to a PoC server belonging to a home network of a receiving PoC user via SIP/IP core networks of a controlling network and a receiving home network (in steps 1-3). At this time, the participating PoC server processes PoC address information for a PoC call receiver and PoC address information of a PoC call requestor contained in the call request message, and uses them to connect the call. Meanwhile, the participating PoC server can recognize, from the address information of the receiving PoC client, that the pre-established session exists between a corresponding PoC user and a PF, and stores a PoC client response mode according to a mode setup of the PoC user. At this time, a PF B performs a suitable internal processing procedure to return an OK response to the call request message (in steps 4-6). Here, the OK response is routed along a path used to send the call request message according to a routing rule of an IMS network.

In the automatic response procedure of steps 4-6, the participating PoC server will use a pre-established session in which a negotiation was made in advance for a media parameter between the participating PoC server and the receiving PoC user, and the PF predicts that the receiving PoC client will automatically accept the session request from a granted PoC call requester and sends the OK response.

Figure 1:
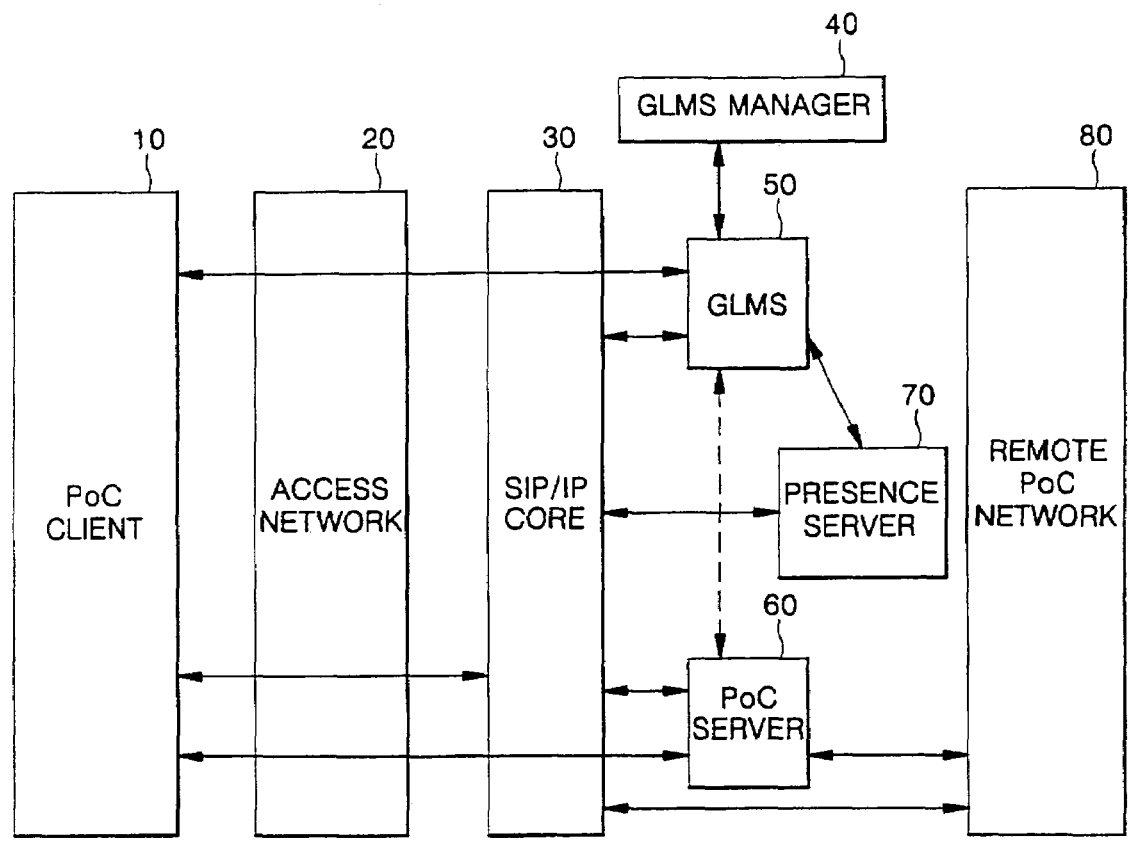
FIG. 1 is a block diagram illustrating a conventional PoC service system.
Figure 2:
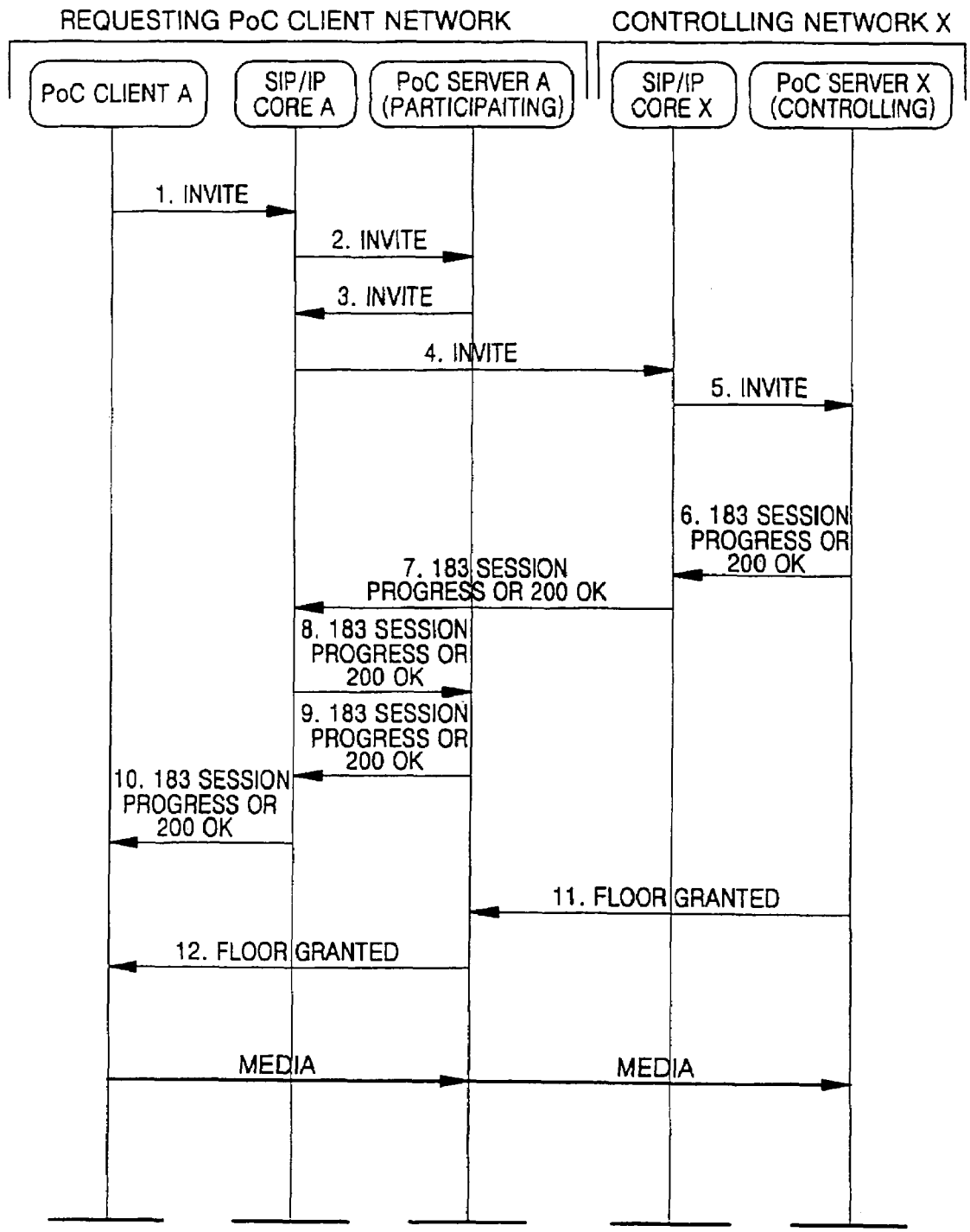
FIG. 2 is a flow diagram illustrating a conventional sending PoC call connection procedure in an automatic answer mode.
Figure 3:
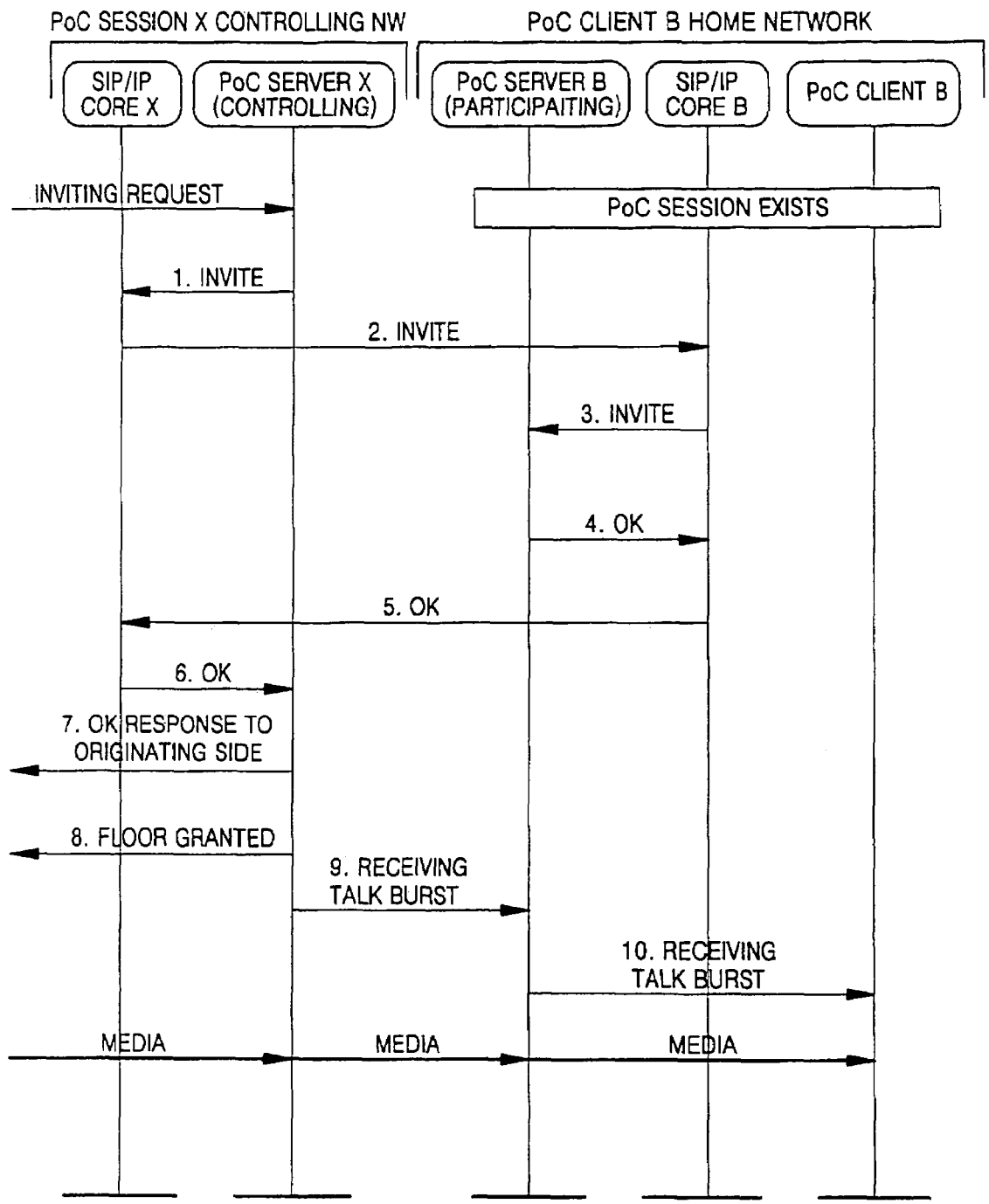
FIG. 3 is a flow diagram illustrating a conventional receiving PoC call connection procedure in an automatic answer mode.

The OK response signal described above is returned to the PoC server on the controlling network ("controlling PoC server") (in steps 6) and then transferred to a home network of the PoC call requester (in step 7). The OK response signal is recognized at the PoC call sender in the same manner as the receiving PoC user directly grants the call, and the OK response is returned to the PoC client of the call requester, so that a dialogue is realized and the SIP call procedure is completed. Meanwhile, as shown in FIG. 2, after the OK response and the floor granted signal are both transferred from the controlling PoC server to the PoC sending client 5 (step 8), the controlling PoC server on the transfers a talk burst transmission signal to the receiving PoC client via the receiving PoC server PF B (in steps 9-10). In this case, a RTCP talk burst message including an automatic response indication is transferred at the PF B. As such, the automatic response signal is transmitted using the talk burst signal, thereby eliminating additional SIP signaling which may lead to transmission burden. Next, the receiving PoC client receives the OK signal as the automatic response from the PoC server and recognizes that the media stream will be received soon. Finally, after receiving the automatic response message over the RTCP talk burst message, the PoC client receives subsequent media (e.g., a voice signal).

Meanwhile, the RTCP talk burst message may pass through the PF depending on whether the PF exists on a media path, and may be directly transferred to the PoC client if the PF does not exist in the media path. When the media path includes the PF B, the automatic response signal can be included in the PF B (which is not required in step 10), and when the media path does not include the PF B, the automatic response signal should be included in the CF (which is required in steps 9-10).

Figure 6:
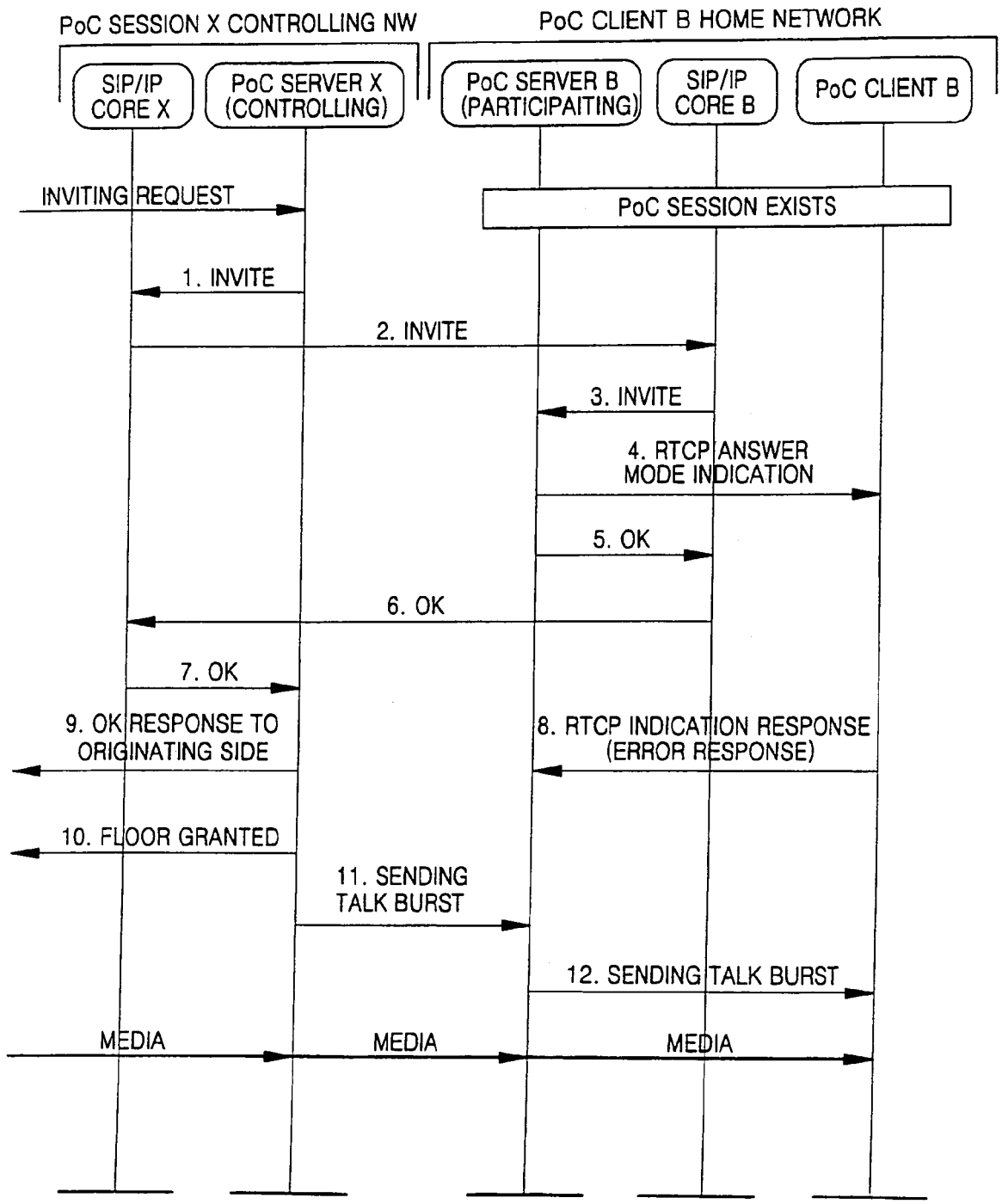
FIG. 6 is a flow diagram illustrating a PoC call connection procedure including an RTCP message in accordance with a second embodiment of the present invention.

In an alternative embodiment of the present invention, the RTCP message indicating the automatic response mode may be transferred to the receiving PoC client at the time when the PoC call request message from the transmitting side arrives at the receiving PF (immediately after stet 3 in FIG. 5). Such a PoC session connection procedure is shown in FIG. 6. (Referring to FIG. 6, steps 1-3, 5-7, and 9-10, are the same as those illustrated in FIG. 5, in which the RTCP talk burst transmission message in steps 11-12 (of FIG. 6) does not include a response mode indication.

After receiving PF transfers an indication to indicate an automatic response to the PoC client B using the RTCP message in response to the PoC session request from the sending side, the receiving PoC client recognizes that a corresponding media stream will be received soon (in step 4). Meanwhile, the receiving PoC server sends the OK response signal to the sending network regardless of the receipt of the response (in step 5). Meanwhile, the client, which receives the automatic response indication, sends an error occurrence signal from the client to the PF using the RTCP message when its response mode is in a manual mode and does not match that of the PF. The PoC server blocks a transferred media stream in response to receiving such an error signal, preventing a media stream from being transmitted to the terminal.

A structure of the RTCP message indicating a response mode, which is transferred to the receiving PoC client, in FIG. 5 can be embodied in an RTCP message payload format as shown in FIG. 7, for example. From message information containing the response mode indication, it can be determined that the media stream will be soon received. As shown in FIG. 7, the structure of the RTCP message requires general transmission related information such as version information, sub-type information and length information, and address information, name information, talk burst connection information of a PoC user, and includes automatic answer indication information specified herein.

The structure of an error answer RTCP message transmitted from the receiving PoC client to the PF as shown in FIG. 6 may be embodied in an format shown in FIG. 8, for example. As shown in FIG. 8, the structure of an RTCP packet includes general RTCP transmission related information such as version information, sub-type information and length information, address information and name information of a PoC user, and session termination information and error code information specified herein.

Meanwhile, when there is no field value indicating the automatic answer in indicating an answer mode at the PF, the field value can be expressed by a binary system (e.g., an auto-answer indication=1 in the automatic answer, and a manual-answer indication=0 in a manual answer). In another embodiment of the present invention, the procedure including the automatic answer indication may be performed by the PoC server on the controlling network along the path of the RTCP/RTP bearer or by the PoC server on the receiving home network, as described above. Further, as the receiving PoC client receives information including the automatic answer indication from the receiving PoC server, it can recognize that the media stream will be received soon.

While a path between the PoC server and the client and additional resource reservation may be included according to the use of the pre-established session, detailed description thereof will be omitted since it departs from the subject matter of the present invention. The requirement for the pre-established session needed in the present invention is not affected by the definition of the pre-established session, and can be more easily realized according to extended definition of the pre-established session.

When the pre-established session is set at the PoC call receiver and the automatic answer mode is set at the PoS server included in the pre-established session, among various PoC call processing procedures occurring when various functions and characteristics of the PoC system are considered, the present invention suggests a method for facilitating a call processing responsive to the PoC call request.

Generally, an automatic answer mode is a service wherein a receiving PoC client directly answers an incoming call without any manual operation and performs rapid call processing to receive media.

The present invention discloses a process wherein when the receiving PoC client and receiving PoC server operate in the automatic answer mode, and the receiving PoC system to which the pre-established session is established has received the call connection request message from the sending PoC server, the PF transfers information including additional data to the receiving PoC client. Accordingly, the receiving PoC client can recognize that the media stream will be received soon even in the automatic answer mode, and the PoC client can perform the call processing responsive to the PoC call request in the PoC client even when there is a discrepancy in an answer mode between the receiving PoC server and the receiving PoC client. As a result, accompanying signaling in the network is reduced and a high-speed PoC call connection is maintained. It is possible to provide enhanced service to the PoC user and efficiently manage communication resources by preventing unnecessary media transmission at a service provider.

Especially, the present invention suggests a signaling method that can be embodied without being affected by a race condition where answer modes between the PoC user terminal and the PoC server are not synchronized, so that there is a corresponding effect in terminal operation.

While the present invention has been described with reference to exemplary embodiments thereof, it will be understood by those skilled in the art that various changes in form and detail may be made therein without departing from the scope of the present invention as defined by the following claims.

What is claimed is:

1. A call processing method in a PoC network in which a session is established in advance between a receiving PoC client and a receiving PoC server, and an automatic response mode is established in the receiving PoC server, the method comprising the steps of:
   receiving, by the receiving PoC server, a call request message transmitted from a sending PoC server;
   sending, by the receiving PoC server, a response signal corresponding to the call request message; and
   receiving information to notify that a media stream will be transmitted to the receiving PoC client, the information including an address and a name of a sending PoC client and a Manual Answer Override (MAO) indication.

2. The method according to claim 1, wherein the information to notify that the media stream will be transmitted is embodied in Real-time Transport Control Protocol (RTCP) payload.

3. The method according to claim 1, wherein the information to notify that the media stream will be transmitted further comprises at least one of version information, sub-type information, length information, and automatic answer indication information.

4. The method according to claim 1, further comprising the step of transmitting an error signal to the receiving PoC server when a response mode of the receiving PoC client is not in accord with a response mode of the receiving PoC server.

5. The method according to claim 4, wherein the error signal is embodied in a Real-time Transport Control Protocol (RTCP) payload.

6. The method according to claim 4, wherein the error signal includes a session termination request and an error code.

7. The method according to claim 4, wherein the error signal further comprises at least one of version information, sub-type information, length information, and an address and a name of a PoC client.

8. A call processing system in a PoC network in which a session is established in advance between a receiving PoC client and a receiving PoC server, and an automatic response mode is established in the receiving PoC server, the system comprising:
   a PoC sewer for receiving a call request message transmitted from a sending PoC server, and sending a response message corresponding to the call request message; and
   a receiving PoC client for receiving information to notify that a media stream will be received from the receiving PoC server, the information including an address and a name of a sending PoC client and a Manual Answer Override (MAO) indication.

9. The system according to claim 8, wherein the information to notify that the media stream will be received is embodied in a Real-time Transport Control Protocol (RTCP) payload.

10. The system according to claim 8, wherein the information to notify that the media stream will be received further comprises at least one of version information, sub-type information, length information, and automatic answer indication information.

11. The system according to claim 8, wherein an error signal is transmitted to the receiving PoC server when a response mode of the receiving PoC client is not in accord with a response mode of the receiving PoC server.

12. The system according to claim 11, wherein the error signal is embodied in a Real-time Transport Control Protocol (RTCP) payload.

13. The system according to claim 11, wherein the error signal includes a session termination request and an error code.

14. The system according to claim 11, wherein the error signal further comprises at least one of version information, sub-type information, length information, and an address and a name of a PoC client.

15. A call processing method in a PoC network, the method comprising the steps of:
   establishing, at a PoC client, a pre-established session with a PoC server;
   establishing, by the PoC client, an automatic response mode to the PoC server; and
   receiving, by the PoC client, information to notify that a media stream will be received from the PoC server which has received a call request message the information comprising an address and a name of a sending PoC client and a Manual Answer Override (MAO) indication.

16. The method according to claim 15, wherein the information to notify that the media stream will be received is received in a Real-time Transport Control Protocol (RTCP) payload.

17. The method according to claim 15, wherein the information to notify that the media stream will be received further comprises at least one of version information, sub-type information, length information, and automatic answer indication information.

18. The method according to claim 15, further comprising the step of transmitting an error signal to the receiving PoC server when a response mode of the receiving PoC client is not in accord with the response mode of the receiving PoC server.

19. The method according to claim 18, wherein the error signal includes a session termination request and an error code.

20. The method according to claim 18, wherein the error signal further comprises at least one of version information, sub-type information, length information, and an address and a name of a PoC client.

21. The method according to claim 15, wherein the error signal is transmitted in a Real-time Transport Control Protocol (RTCP) payload.

22. A PoC client for performing call processing in a PoC network, comprising:
   a PoC client for:

establishing a pre-established session with a receiving PoC server, establishes an automatic response mode with the receiving PoC server; and receiving information to notify that a media stream will be received from the PoC server which has received a call request message, the information including an address and name of a sending PoC client and a Manual Answer Override (MAO) indication.

23. The PoC client according to claim 22, wherein the information to notify that the media stream will be received is embodied in a Real-time Transport Control Protocol (RTCP) payload.

24. The PoC client according to claim 22, wherein the information to notify that the media stream will be transmitted further comprises at least one of version information, sub-type information, length information, and automatic answer indication information.

25. The PoC client according to claim 22, wherein an error signal is transmitted to the receiving PoC server when a response mode of the receiving PoC client is not in accord with the response mode of the receiving PoC server.

26. The PoC client according to claim 25, wherein the error signal is embodied in a Real-time Transport Control Protocol (RTCP) payload.

27. The PoC client according to claim 26, wherein the error signal further comprises at least one of version information, sub-type information, length information, and an address and a name of the PoC user.

28. The PoC client according to claim 25, wherein the error signal includes a session termination request and an error code.

* * * * *